US008000013B2

(12) United States Patent
Jethmalani et al.

(10) Patent No.: US 8,000,013 B2
(45) Date of Patent: Aug. 16, 2011

(54) TINTED LENSES THAT CORRECT FOR HIGH ORDER ABERRATIONS

(75) Inventors: Jagdish M. Jethmalani, San Diego, CA (US); Gomaa Abdelsadek, San Diego, CA (US); Erdem Cetin, San Diego, CA (US); Shawn McCarty, San Diego, CA (US); Junhao Ge, San Diego, CA (US)

(73) Assignee: Ophthonix, Inc., Vista, CA (US)

( * ) Notice: Subject to any disclaimer, the term of this patent is extended or adjusted under 35 U.S.C. 154(b) by 1064 days.

(21) Appl. No.: 11/726,075

(22) Filed: Mar. 20, 2007

(65) Prior Publication Data

US 2008/0018853 A1 Jan. 24, 2008

Related U.S. Application Data

(63) Continuation-in-part of application No. 10/936,030, filed on Sep. 7, 2004, now Pat. No. 7,371,804.

(60) Provisional application No. 60/784,394, filed on Mar. 20, 2006.

(51) Int. Cl.
*G02B 5/20* (2006.01)

(52) U.S. Cl. ......... 359/589; 359/237; 359/892; 359/290

(58) Field of Classification Search .................. 359/589, 359/237, 892, 290
See application file for complete search history.

(56) References Cited

U.S. PATENT DOCUMENTS

| 5,236,970 | A | 8/1993 | Christ et al. |
| 5,807,906 | A | 9/1998 | Bonvallot et al. |
| 6,391,983 | B1 | 5/2002 | Bateman et al. |
| 6,450,642 | B1 | 9/2002 | Jethmalani et al. |
| 6,712,466 | B2 | 3/2004 | Dreher |
| 6,786,602 | B2 | 9/2004 | Abitbol |
| 6,813,082 | B2 * | 11/2004 | Bruns ........................... 359/589 |
| 6,840,619 | B2 | 1/2005 | Dreher |
| 6,942,339 | B2 | 9/2005 | Dreher |
| 6,989,938 | B2 | 1/2006 | Bruns |
| 7,021,764 | B2 | 4/2006 | Dreher |
| 7,371,804 | B2 | 5/2008 | Jethmalani et al. |
| 2002/0080464 | A1 | 6/2002 | Bruns |
| 2002/0142227 | A1 | 10/2002 | Dhar et al. |
| 2003/0003295 | A1 * | 1/2003 | Dreher et al. ................. 428/332 |
| 2003/0081172 | A1 | 5/2003 | Dreher |
| 2003/0143391 | A1 * | 7/2003 | Lai ................................ 428/332 |
| 2004/0008319 | A1 | 1/2004 | Lai et al. |
| 2004/0235974 | A1 * | 11/2004 | Lai .................................... 522/2 |
| 2005/0127570 | A1 | 6/2005 | Pyles et al. |

FOREIGN PATENT DOCUMENTS

| WO | WO 97/17399 | * 5/1997 |
| WO | WO 97/20247 | 6/1997 |
| WO | WO 2004/015481 | 2/2004 |
| WO | WO 2005/114302 | 12/2005 |

OTHER PUBLICATIONS

International Search Report for PCT/US2007/006992, mailed on Aug. 27, 2007, 4 pages.
Jacobine, vol. 3, Ed. By Fouassier and Rabek, Elsevier Applied Science, pp. 219-268.
U.S. Appl. No. 10/848,942, filed May 18, 2002.
U.S. Appl. No. 10/935,798, filed Sep. 7, 2004.
U.S. Appl. No. 10/935,799, filed Sep. 7, 2004.

* cited by examiner

*Primary Examiner* — Ling-Siu Choi
(74) *Attorney, Agent, or Firm* — Morrison & Foerster LLP (57) ABSTRACT

Disclosed herein are photopolymerizable compositions and formulations that comprise photochromic dyes, photochromic blue light blocking dyes, permanent dyes, permanent blue blocking dyes, and/or their combinations. In some variations, these formulations are suited for example, for sandwiching between lens blanks to form semi-finished lens assemblies to form a tinted lens useful in sunglasses. The formulations are also suitable for correcting optical aberrations, and may provide a photochromic effect when exposed to sunlight.

14 Claims, 1 Drawing Sheet

TINTED LENSES THAT CORRECT FOR HIGH ORDER ABERRATIONS

CROSS-REFERENCE TO RELATED-APPLICATIONS

This is a Continuation-in-Part Application of co-pending application Ser. No. 10/936,030, filed 7 Sep. 2004 now U.S. Pat. No. 7,371,804. The present application also claims the benefit of U.S. Provisional Application Ser. No. 60/784,394, filed 20 Mar. 2006. Both of the aforementioned applications are incorporated herein by reference in their entirety.

BACKGROUND OF THE INVENTION

The present invention relates to tinted ophthalmic lenses having a programmable polymer layer and which correct for high order aberrations. In particular, such lenses are tinted by adding a dye to the polymer layer. The polymer layer can be dyed to mask a natural color of the polymer for cosmetic purposes or to form a colored lens such as a sunglass lens. Alternatively, the lenses can be tinted by coating the lens with a dye.

Wavefront aberrators that correct for both low order and high order aberrations are known. These aberrators contain a polymer layer wherein the polymer layer can be programmed by curing to have a variable index of refraction profile or a constant index of refraction throughout the aberrator. See for example the following U.S. Pat. Nos. 6,813,082; 6,989,938; 6,712,466; 6,840,619; 6,942,339 and 7,021,764 all of which are incorporated herein by reference. When polymers cure and age they can take on off-colors usually a light yellow color. These off-colors do not adversely affect the performance of the aberrator. Aberrators which are eyeglasses that take on these off-colors may be undesirable for cosmetic reasons.

Problems exist in the art with tinting the hard coating of plastic optical lenses such as CR-39™, polycarbonate lenses and 1.6 high index lenses because of the properties of the hard coat. See US Published Patent Application 2006/0148952, which is incorporated herein by reference. While tintable hard coats are available they are generally softer than a non-tintable hard coat.

Throughout this specification reference may be made to documents for the purpose of describing the background of the invention or for describing aspects of the invention. However, no admission is made that any reference, including any patent or patent document, cited in this specification constitutes prior art. In particular, it will be understood that, unless otherwise stated, reference to any document herein does not constitute an admission that any of these documents form part of the common general knowledge in the art in Australia or in any other country. The discussion of the references states what their authors assert, and the applicant reserves the right to challenge the accuracy and pertinency of the content of any of the documents cited herein.

SUMMARY OF THE INVENTION

Disclosed herein are photopolymerizable compositions and formulations that comprise photochromic dyes, photochromic blue light blocking dyes, permanent dyes, permanent blue blocking dyes, and/or their combinations. In some variations, these formulations are suited for example, for sandwiching between lens blanks to form semi-finished lens assemblies to form a tinted lens useful in sunglasses. The formulations are also suitable for correcting optical aberrations, and may provide a photochromic effect when exposed to sunlight.

In accordance with the present invention the Yellowness Index (YI) of a wavefront aberrator that contains a sandwich configuration of two transparent plates having a cured polymer sandwiched in between said plates is treated by adding an effective Yellowness Index reducing amount of a violet or blue dye to said curable polymer prior to said polymer being cured whereby the Yellowness Index of the dyed polymer is less than the Yellowness Index of the polymer without the dye. Preferably, the Yellowness Index of the cured wavefront aberrator is under 10.

The present wavefront aberrator with a reduced YI number is made by providing two (2) transparent plates, depositing a layer of curable material between the two transparent plates wherein said curable material contains one or more monomers and an effective Yellowness Index reducing amount of a violet or blue dye and curing the curable material to form the wavefront aberrator having a reduced Yellowness Index number compared to a wavefront aberrator made with said curable material not having said dye. The layer of curable material may be cured to form a uniform refractive index profile or it can be cured to form a variable refractive index profile.

The present invention can also be viewed as an improvement in a method of making a wavefront aberrator by forming a layer of curable material between two transparent plates and curing said curable material wherein the improvement comprises adding an effective amount of a purple or blue dye to said curable material prior to curing whereby the YI of the cured polymer is less than if the cured polymer contained no dye.

In a preferred embodiment of the present invention an ophthalmic sunglass lens is made having a front lens having a constant index of refraction, a back lens having a constant index of refraction, and a curable material in between said front and back lenses wherein said curable material contains one or more monomers and an effective amount of a dye to tint said lens. After the curable material is sandwiched between the front lens and back lens the curable material can be partially cured to form a polymer matrix. This partially cured ophthalmic lens can then be stored or shipped for future use in preparing a final tinted lens. In this regard the present invention is directed to the lens assembly that has a curable material sandwiched between two lenses regardless of the extent that the cured material is actually cured. The uncured or partially cured lens assembly is useful in the manufacturing process as an intermediate lens assembly which can be stored or shipped for future use. The fully cured lens assembly represents the ophthalmic sunglass lens having a desired tinted color.

In another preferred embodiment an ophthalmic lens having a reduced Yellowness Index is comprised of a front lens having a constant index of refraction, a back lens having a constant index of refraction and a curable material in between said front and back lenses wherein said curable material contains one or more monomers and an effective Yellowness Index reducing amount of a violet or blue dye. The cured polymer has a YI less than an un-dyed polymer and preferably has an YI number of less than 10. After the curable material is sandwiched between the front lens and back lens the curable material can be partially cured to form a polymer matrix. This partially cured ophthalmic lens can then be stored or shipped for future use in preparing a final tinted lens having a reduced YI number. In this regard the present invention is directed to the lens assembly that has a curable material sandwiched between two lenses regardless of the extent that the cured material is actually cured. The uncured or partially cured lens assembly is useful in the manufacturing process as an intermediate lens assembly which can be stored or shipped for future use. The fully cured lens assembly represents the ophthalmic lens having a reduced YI number.

DETAILED DESCRIPTION OF THE FIGURES

DETAILED DESCRIPTION OF THE EMBODIMENTS

In practicing the present invention a dye is added to a curable material prior to the curable material being used as a component in a wavefront aberrator and preferably an ophthalmic lens. The dye can serve one of two purposes. First, a blue or purple dye is added in small amounts to a curable material to reduce the Yellowness Index of the aberrator after the curable material (polymer) is fully cured. Preferably, the dye is added in amounts to mask the yellow tint of the un-dyed cured polymer but at the same time not imparting a blue color to the lenses. It is preferred to add the dye to obtain a YI number of less than 10 but greater than 5 and preferably greater than 8 in the finished aberrator. Second, one or more dyes can be added to a curable material prior to the curable material being used as a component in an ophthalmic lens in order to tint the lens for use as a sunglass lens.

The curable material of the present invention is used an optical element in the preparation of wavefront aberrators and in particular ophthalmic lenses. The curable material is capable of being cured at different rates to form a variable index of refraction profile in the cured polymer layer. This variable index of refraction is used to correct high order aberrations of the eye. Because the refractive index of the cured polymer is functionally important for making the ophthalmic lenses it is necessary to take into account the effect a dye will have, if any, on the final refractive index of the cured polymer. See examples below and in particular Table 1 which shows the effect that various dyes have on the refractive index of a cured polymer.

The dyes useful to tint the curable material can be any permanent dye or photochromic dye. Preferably, the dye is soluble in the curable material which contains monomers, polymers, initiators, stabilizers, sensitizers, solvents and the like. The dyes are mixed with the curable material prior to forming the layer on the wavefront aberrator and in the case of ophthalmic lenses prior to forming the layer between the front and back lenses. Standard mixing techniques are employed. If the curable material is separated into two or more parts the dye can be added to either part before final mixing.

Photochromic dyes include spiro-naphthoxazines, naphthopyrans, anthraquinones, phthalocyanines, spiro-oxazines, chromenes, pyrans, fulgicides and mixtures thereof. Reversacol photochromic dyes are available from James Robinson Ltd. (UK) and several of these dyes are listed in the examples below. Permanent dyes can be any permanent dye. Preferred permanent dyes are those that are soluble in the curable material. Permanent dyes include BPI dyes from Brain Power, Inc. (USA) such as BPI Gray and BPI Black. Sigma Aldrich offers a line of permanent dyes such as Solvent Blue, Solvent Black, Solvent Yellow, Solvent Red and Solvent Orange dyes. Preferred dyes include Solvent Black 3, Solvent Black 5, Solvent Black 7, Solvent Blue 43, Solvent Blue 35, Solvent Blue 59, Solvent Blue 14, Solvent Blue 37, Solvent Green 3 and Solvent Red 24. A particularly preferred dye is Solvent Blue 35.

When adding the dye to the curable material to mask the slight yellow color that some polymers exhibit a purple or blue dye is added to the curable material in amounts to mask the yellowness but also in amounts that do not turn the polymer a noticeable blue. A neutral color is desired. In the case of Solvent Blue 35 dye a suitable amount of dye in the curable material is from about 0.0007 wt % to about 0.0020 wt % and preferably from about 0.0010 wt % to about 0.0015 wt %. A particularly preferred amount of Solvent Blue 35 in the curable material is about 0.0012 wt %. When adding the dye for tinting for use as sunglasses then the dyes are added in amounts that aesthetically or cosmetically desirable. See examples below.

All patents, patent applications, provisional applications, and publications referred to or cited herein are incorporated by reference in their entirety, including all figures and tables, to the extent they are not inconsistent with the explicit teachings of this specification.

The following examples illustrate the practice of the present invention but should not be construed as limiting its scope.

EXAMPLE 1

A lens formulation kit having two parts was made as follows.

Part I: In a 500 mL round flask was placed 100.03 gm DEN 438 and 49.42 gm diallyether bisphenol A. The material was heated to ~75° C. on a water bath and mixed on a rotary evaporator until homogeneous.

Part II: In a 500 mL round flask was placed 149.98 gm trimethylolpropane tris(3-mercaptopropionate), 3.2714 gm tetrabutylammonium bromide, 0.3274 gm Irgacure 184, and 0.0654 gm N-PAL. The material was heated to 50° C. over a water bath and mixed on a rotary evaporator to dissolve the solids.

EXAMPLE 2

A mixture of 8.1796 gm of Part I and 7.1055 gm of Part II (Parts I and II from Example 1) was mixed in a beaker and stirred with a glass rod until homogeneous to make a lens formulation (LF). The material was then degassed under vacuum for approximately 10 minutes to remove the bulk of the dissolved gas.

EXAMPLE 3

3.35 mg of Reversacol Rush Yellow was placed in a 20 mL scintillation vial. To this was added 1.0584 gm of the mixture of EXAMPLE 2. Approximately 2-3 mL of methylene chloride was added and the mixture was stirred with a glass rod until all dye had dissolved. The mixture was then degassed under vacuum for a few minutes to remove most of the air bubbles. The mixture was then purged of solvent by gently blowing a stream of argon over the surface of the material. The material was then placed under vacuum again to remove the last traces of solvent.

EXAMPLE 4

The mixture of EXAMPLE 3 was transferred to a glass plate containing a wire spacer. A second glass plate was placed on top of the mixture to form a sandwich. The mixture in the sandwich assembly was cured (partially) for 5.5 hours at 75° C. The mixture was then cured by UV light in the range 320-390 nm at 10 mW/cm2 for 10 minutes a side while heated to 85° C. The difference in refractive index between the original sandwich and the cured sandwich was 0.0058.

EXAMPLE 5

5.18 mg of Reversacol Corn Yellow was placed in a 20 mL scintillation vial. To this was added 1.0186 gm of the mixture of EXAMPLE 2. Approximately 2-3 mL of methylene chloride was added and the mixture stirred with a glass rod until all dye had dissolved. The mixture was then degassed under vacuum for a few minutes to remove most of the air bubbles. The mixture was then purged of solvent by gently blowing a stream of argon over the surface of the material. The material was then placed under vacuum again to remove the last traces of solvent.

EXAMPLE 6

The mixture of EXAMPLE 5 was transferred to a glass plate containing a wire spacer. A second glass plate was placed on top of the mixture to form a sandwich. The mixture in the sandwich assembly was cured (partially) for 5.5 hours at 75° C. The mixture was then cured by UV light in the range 320-390 nm at 10 mW/cm2 for 10 minutes a side while heated to 85° C. The difference in refractive index between the original sandwich and the cured sandwich was 0.0062.

EXAMPLE 7

1.95 mg of Reversacol Aqua Green and 2.00 mg of Reversacol Corn Yellow was placed in a 20 mL scintillation vial. To this was added 1.1292 gm of the mixture of EXAMPLE 2. Approximately 2-3 mL of methylene chloride was added and the mixture stirred with a glass rod until all dye had dissolved. The mixture was then degassed under vacuum for a few minutes to remove most of the air bubbles. The mixture was then purged of solvent by gently blowing a stream of argon over the surface of the material. The material was then placed under vacuum again to remove the last traces of solvent.

EXAMPLE 8

The mixture of EXAMPLE 7 was transferred to a glass plate containing a wire spacer. A second glass plate was placed on top of the mixture to form a sandwich. The mixture in the sandwich assembly was cured (partially) for 5.5 hours at 75° C. The mixture was then cured by UV light in the range 320-390 nm at 10 mW/cm2 for 10 minutes a side while heated to 85° C. The difference in refractive index between the original sandwich and the cured sandwich was 0.0051.

EXAMPLE 9

2.24 mg of Reversacol Berry Red and 2.10 mg of Reversacol Corn Yellow was placed in a 20 mL scintillation vial. To this was added 1.0261 gm of the mixture of EXAMPLE 2. Approximately 2-3 mL of methylene chloride was added and the mixture stirred with a glass rod until all dye had dissolved. The mixture was then degassed under vacuum for a few minutes to remove most of the air bubbles. The mixture was then purged of solvent by gently blowing a stream of argon over the surface of the material. The material was then placed under vacuum again to remove the last traces of solvent.

EXAMPLE 10

The mixture of EXAMPLE 9 was transferred to a glass plate containing a wire spacer. A second glass plate was placed on top of the mixture to form a sandwich. The mixture in the sandwich assembly was cured (partially) for 5.5 hours at 75° C. The mixture was then cured by UV light in the range 320-390 nm at 10 mW/cm2 for 10 minutes a side while heated to 85° C. The difference in refractive index between the original sandwich and the cured sandwich was 0.0024.

EXAMPLE 11

1.07 mg of Reversacol Graphite and 1.78 mg Reversacol Corn Yellow was placed in a 20 mL scintillation vial. To this was added 1.0243 gm of the mixture of EXAMPLE 2. Approximately 2-3 mL of methylene chloride was added and the mixture stirred with a glass rod until all dye had dissolved. The mixture was then degassed under vacuum for a few minutes to remove most of the air bubbles. The mixture was then purged of solvent by gently blowing a stream of argon over the surface of the material. The material was then placed under vacuum again to remove the last traces of solvent.

EXAMPLE 12

The mixture of EXAMPLE 11 was transferred to a glass plate containing a wire spacer. A second glass plate was placed on top of the mixture to form a sandwich. The mixture in the sandwich assembly was cured (partially) for 5.5 hours at 75° C. The mixture was then cured by UV light in the range 320-390 nm at 10 mW/cm2 for 10 minutes a side while heated to 85° C. The difference in refractive index between the original sandwich and the cured sandwich was 0.0045.

Various dyes were employed to tint monomer/polymer mixtures made by mixing Part I and Part II of the kit disclosed in Example 1. The tinted mixtures were made into sandwich assemblies to determine the difference ($\Delta n$) in the refractive index between the original uncured sandwich assembly and the fully cured sandwich assembly. The results are listed in Table 1 below.

TABLE 1

| Color | Dye 1 | Dye 2 | Dye 3 | $\Delta nD$ |
| --- | --- | --- | --- | --- |
| Pale Blue | Reversacol Oxford Blue 0.06% | None | None | 0.0091 |
| Pale Blue | Reversacol Oxford Blue 0.07% | None | None | 0.0076 |
| Deep Blue | Reversacol Plum Red 0.07% | None | None | 0.0091 |
| Brownish Yellow | Reversacol Rush Yellow 0.06% | None | None | 0.0082 |
| Brownish Yellow | Reversacol Rush Yellow 0.1% | None | None | 0.0067 |
| Red Brown | Reversacol Flame 0.06% | None | None | 0.0088 |
| Pale Blue | Reversacol Palatinate Purple 0.06% | None | None | 0.0106 |
| Blue Green | Reversacol Aqua Green 0.07% | None | None | 0.0096 |
| Brown | Reversacol Corn Yellow 0.06% | None | None | 0.0086 |
| Pale Yellow | Reversacol Sunflower 0.06% | None | None | 0.0094 |
| Pale Orange | Reversacol Sunflower 0.10% | None | None | 0.0070 |

TABLE 1-continued

| Color | Dye 1 | Dye 2 | Dye 3 | ΔnD |
|---|---|---|---|---|
| Orange | Reversacol Sunflower 0.14% | None | None | 0.0055 |
| Orange | Reversacol Sunflower 0.19% | None | None | 0.0058 |
| Orange | Reversacol Sunflower 0.20% | None | None | |
| Brick Red | Reversacol Berry Red 0.06% | None | None | 0.0084 |
| Blue Gray | Reversacol Graphite 0.06% | None | None | 0.0087 |
| Blue Green | Reversacol Sea Green 0.06% | None | None | 0.0089 |
| Blue Green | Reversacol Sea Green 0.1% | None | None | 0.0089 |
| Pale Yellow | Reversacol Solar Yellow 0.06% | None | None | 0.0092 |
| Pale Yellow | Reversacol Solar Yellow 0.10% | None | None | 0.0072 |
| Yellow | Reversacol Solar Yellow 0.15% | None | None | 0.0058 |
| Yellow | Reversacol Solar Yellow 0.19% | None | None | 0.0061 |
| | | Light Color Mixes | | |
| Pale Yellow | Reversacol Rush Yellow 0.05% | Reversacol Aqua Green 0.02% | None | 0.0042 |
| Brick Red | Reversacol Flame 0.03% | Reversacol Graphite 0.03% | None | 0.0054 |
| Brown | Reversacol Corn Yellow ~0.035% | Reversacol Graphite ~0.035% | None | 0.0091 |
| Pale Yellow | Reversacol Rush Yellow 0.05% | Reversacol Plum Red 0.02% | None | 0.0040 |
| Yellow | Reversacol Corn Yellow 0.03% | Reversacol Aqua Green 0.03% | None | 0.0047 |
| Deep Blue | Reversacol Plum Red 0.035% | Reversacol Graphite 0.035% | None | 0.0083 |
| Magenta | Reversacol Berry Red 0.035% | Reversacol Plum Red 0.035% | None | 0.0083 |
| Blue | Reversacol Aqua Green ~0.05% | Reversacol Plum Red ~0.05% | None | 0.0086 |
| Brown | Reversacol Plum Red ~0.035% | Reversacol Corn Yellow ~0.035% | None | 0.0082 |
| Blue Gray | Reversacol Aqua Green ~0.04% | Reversacol Flame ~0.05% | None | 0.0081 |
| Blue Green | Reversacol Corn Yellow ~0.03% | Reversacol Sea Green ~0.03% | Reversacol Plum Red ~0.03% | 0.0074 |
| Violet | Reversacol Aqua Green ~0.03% | Reversacol Berry Red ~0.03% | None | 0.0085 |
| Bright Red | Reversacol Berry Red ~0.03% | Reversacol Corn Yellow ~0.03% | None | 0.0101 |
| Light Brown | Reversacol Corn Yellow 0.05% | Reversacol Graphite 0.02% | None | 0.0051 |
| Green | Reversacol Aqua Green 0.09% | Reversacol Solar Yellow 0.07% | None | 0.0078 |
| Pinkish Red | Reversacol Berry Red 0.06% | Reversacol Solar Yellow 0.05% | None | 0.0085 |
| Dark Gray | Reversacol Graphite 0.15% | Reversacol Solar Yellow 0.09% | None | 0.0055 |
| Green | Reversacol Plum Red 0.05% | Reversacol Solar Yellow 0.06% | None | 0.0104 |
| Red Blue | Reversacol Berry Red 0.03% | Reversacol Plum Red 0.03% | None | 0.0098 |
| Blue | Reversacol Berry Red 0.02% | Reversacol Plum Red 0.04% | None | 0.0077 |
| Red Blue | Reversacol Berry Red 0.04% | Reversacol Plum Red 0.02% | None | 0.0080 |
| Violet | Reversacol Berry Red 0.03% | Reversacol Plum Red 0.02% | None | 0.0081 |
| Blue | Reversacol Berry Red 0.01% | Reversacol Plum Red 0.02% | None | 0.0103 |
| Pinkish Red | Reversacol Berry Red 0.02% | Reversacol Plum Red 0.01% | None | 0.0096 |
| Brown | Reversacol Corn Yellow 0.24% | Reversacol Oxford Blue 0.12% | None | 0.0075 |
| Yellow Green | Reversacol Solar Yellow 0.33% | Reversacol Oxford Blue 0.18% | None | 0.0004 |
| Orange | Reversacol Sunflower 0.35% | Reversacol Corn Yellow 0.12% | None | 0.0009 |
| Yellowish Green | Reversacol Corn Yellow 0.35% | Reversacol Aqua Green 0.35% | None | 0.0003 |
| Brown | Reversacol Corn Yellow 0.46% | Reversacol Aqua Green 0.24% | None | 0.0008 |
| Green | Reversacol Corn Yellow 0.23% | Reversacol Aqua Green 0.47% | None | 0.0007 |
| | | Dark Colors and Blue Blockers | | |
| Orange | Reversacol Corn Yellow 0.51% | None | None | 0.0062 |
| Yellow | Reversacol Rush Yellow 0.32% | None | None | 0.0058 |
| Pea Green | Reversacol Aqua Green 0.17% | Reversacol Corn Yellow 0.18% | None | 0.0051 |
| Red | Reversacol Berry Red 0.22% | Reversacol Corn Yellow 0.20% | None | 0.0024 |
| Dark Gray | Reversacol Corn Yellow 0.17% | Reversacol Graphite 0.10% | None | 0.0045 |
| Yellow | Reversacol Rush Yellow 0.52% | None | None | 0.0035 |
| Light Blue | Reversacol Oxford Blue 0.54% | None | None | 0.0040 |
| Dark Blue | Reversacol Plum Red 0.41% | None | None | 0.0010 |
| Dark Gray | Reversacol Graphite 0.30% | Reversacol Plum Red 0.32% | None | 0.0011 |
| Dark Red | Reversacol Corn Yellow 0.24% | Reversacol Plum Red 0.24% | None | 0.0013 |
| Dark Green | Reversacol Corn Yellow 0.10% | Reversacol Graphite 0.11% | Reversacol Sea Green 0.10% | 0.0041 |
| Dark Green | Reversacol Corn Yellow 0.25% | Reversacol Graphite 0.25% | Reversacol Sea Green 0.25% | 0.0093 |
| Pale Brown | Reversacol Flame 0.12% | Reversacol Oxford Blue 0.12% | Reversacol Rush Yellow 0.10% | 0.0078 |
| Brown | Reversacol Flame 0.31% | Reversacol Oxford Blue 0.32% | Reversacol Rush Yellow 0.31% | 0.0108 |
| Gray | Reversacol Solar Yellow 0.23% | Reversacol Graphite 0.23% | None | 0.0009 |
| Red Purple | Reversacol Corn Yellow 0.23% | Reversacol Plum Red 0.23% | None | 0.0053 |
| Brown | Reversacol Sunflower 0.47% | Reversacol Graphite 0.11% | None | 0.0005 |
| Brown | Reversacol Sunflower 0.46% | Reversacol Graphite 0.11% | None | 0.0044 |
| Dark Gray | Reversacol Sunflower 0.59% | Reversacol Graphite 0.23% | None | 0.0025 |
| Brown | Reversacol Sunflower 0.69% | Reversacol Graphite 0.11% | None | 0.0041 |
| Brown | Reversacol Sunflower 0.70% | Reversacol Graphite 0.10% | None | |
| Red | Reversacol Corn Yellow 0.36% | Reversacol Plum Red 0.17% | None | 0.0045 |
| Dark Green | Reversacol Corn Yellow 0.37% | Reversacol Palatinate Purple 0.18% | None | 0.0069 |
| Dark Green | Reversacol Corn Yellow 0.47% | Reversacol Palatinate Purple 0.12% | None | 0.0006 |
| Dark Green | Reversacol Corn Yellow 0.58% | Reversacol Palatinate Purple 0.23% | None | 0.0009 |
| Dark Green | Reversacol Corn Yellow 0.42% | Reversacol Palatinate Purple 0.18% | None | 0.0008 |
| Dark Green | Reversacol Corn Yellow 0.48% | Reversacol Palatinate Purple 0.21% | None | 0.0010 |
| Dark Green | Reversacol Corn Yellow 0.54% | Reversacol Palatinate Purple 0.25% | None | 0.0009 |
| Dark Green | Reversacol Corn Yellow 0.55% | Reversacol Palatinate Purple 0.24% | None | 0.0009 |
| Dark Green | Reversacol Corn Yellow 0.55% | Reversacol Palatinate Purple 0.23% | None | 0.0012 |

TABLE 1-continued

| Color | Dye 1 | Dye 2 | Dye 3 | ΔnD |
|---|---|---|---|---|
| Permanent Blue Blockers with Light Colors | | | | |
| Green | Reversacol Plum Red 0.06% | Solvent Yellow 33 0.02% | None | 0.0071 |
| Orange | Reversacol Berry Red 0.06% | Solvent Yellow 33 0.02% | None | 0.0039 |
| Medium Gray | Reversacol Graphite 0.06% | Solvent Yellow 33 0.02% | None | 0.0107 |
| Pale Yellow | Reversacol Rush Yellow 0.17% | Solvent Yellow 33 0.02% | None | 0.0074 |
| Red | Reversacol Flame 0.08% | Solvent Yellow 33 0.02% | None | 0.0073 |
| Green | Reversacol Aqua Green 0.07% | Solvent Yellow 33 0.02% | None | 0.0083 |
| Green | Reversacol Aqua Green 0.10% | Solvent Yellow 33 0.05% | None | |
| Orange | Reversacol Corn Yellow 0.06% | Solvent Yellow 33 0.02% | None | 0.0089 |
| Green | Reversacol Palatinate Purple 0.06% | Solvent Yellow 33 0.02% | None | 0.0083 |
| Green | Reversacol Oxford Blue 0.15% | Solvent Yellow 33 0.02% | None | 0.0066 |
| Green | Reversacol Sea Green 0.16% | Solvent Yellow 33 0.02% | None | 0.0065 |
| Permanent Dyes | | | | |
| Yellow | Solvent Yellow 33 0.02% | None | None | 0.0086 |
| Orange | Solvent Orange 1 0.05% | None | None | 0.0060 |
| Red | Solvent Red 24 0.05% | None | None | 0.0060 |

EXAMPLE 13

Reducing Yellowness Index of an Optical Lens

A. Dye: Solvent Blue 35 dye was purchased from Sigma-Aldrich. This dye was dissolved in a small portion of methylene chloride and the color compared with that of the BPI Gray. On the basis of color match, cost and solubility in the monomer/polymer lens formulation ("LF") the Solvent Blue 35, Formula 1 below, was chosen for further investigation.

Formula 1

B. Yellowness Index in Gels: Solvent Blue 35 is more easily soluble and produced a more intense color in the LF than BPI Gray. A stock solution of 0.0108% Solvent Blue 35 in LF Part II (Example 1) was prepared. Then slides were prepared by diluting the stock solution with dye-free LF Part II and then mixing with LF Part I (Example 1) and curing thermally for 5½ hours at 75° C. to produce a partially cured gel. Weight percent of Solvent Blue 35 was 0.0002, 0.0003, 0.0004 and 00005. Yellowness Index (YI) on all slides was measured on the gels. The results are given in Table 2.

TABLE 2

| YI of Light Blue Gels | | |
|---|---|---|
| Nominal Conc. | Slide ID | Gel |
| 0.0002% | A | 8.2 |
| 0.0002% | B | 8.5 |
| 0.0002% | C | 8.1 |
| 0.0002% | D | 7.7 |
| 0.0002% | E | 8.5 |
| 0.0003% | A | 7.7 |
| 0.0003% | B | 7.4 |
| 0.0003% | C | 6.4 |
| 0.0003% | D | 7.6 |

TABLE 2-continued

| YI of Light Blue Gels | | |
|---|---|---|
| Nominal Conc. | Slide ID | Gel |
| 0.0003% | E | 8.0 |
| 0.0004% | A | 7.6 |
| 0.0004% | B | 7.9 |
| 0.0004% | C | 8.0 |
| 0.0004% | D | 8.1 |
| 0.0004% | E | 7.7 |
| 0.0005% | A | 7.0 |
| 0.0005% | B | 7.7 |
| 0.0005% | C | 7.4 |
| 0.0005% | D | 6.4 |
| 0.0005% | E | 7.8 |

C. Yellowness Index and Refractive Index in Fully Cured Film: One slide (A) from each set was taken and cured at 40 mW/cm2 for 15 minutes on each side, for a total exposure of 72 J/cm2 to form a film. Yellowness Index was re-measured and compared with the original value of the gel.

TABLE 3

| YI Comparison between Gels and Films | | | | |
|---|---|---|---|---|
| Nominal Conc. | Slide ID | Gel | Film | ΔYI |
| 0.0002% | A | 8.2 | 9.2 | 1.0 |
| 0.0003% | A | 7.7 | 9.0 | 1.3 |
| 0.0004% | A | 7.6 | 9.5 | 1.9 |
| 0.0005% | A | 7.0 | 8.8 | 1.8 |

The blue color completely disappeared from the slide, suggesting that the dye may be partially destroyed during flooding.

Using the stock solution used to prepare the gels in 2, slides were prepared at higher concentrations of dye (Table 1). The slides were photocured at 40 mW/cm2 for 15 minutes per side at 85° C. and the refractive index measured (Table 5). These slides were then examined and 0.001% was determined to be a suitable concentration.

TABLE 4

Composition of Dyed ZLF III

| gm Part II Stock Solution | gm Undyed Part II | gm Part I | gm Mixed Part II | Ratio | Dye Conc. |
|---|---|---|---|---|---|
| 0.5013 | 2.0141 | 1.0043 | 0.8708 | 1.151 | 0.00100% |
| 1.0084 | 1.5051 | 1.0048 | 0.8702 | 1.151 | 0.00201% |

TABLE 5

Light Blue RI Data nD

| Conc | Liquid | Gel | Film | Δ nD Gel to Film |
|---|---|---|---|---|
| 0.00100% | 1.5505 | 1.5738 | 1.5831 | 0.0093 |
| 0.00201% | 1.5520 | 1.5749 | 1.5834 | 0.0085 |

D. Dye Effect on Photoinitiator: LF with 0.001% Solvent Blue 35 was examined for photocurability. Slides were made with either 0.1% Irgacure 184 or 0.1% Irgacure 651. Slides were cured at 40 mW/cm2 and refractive index measured (Table 1 and Table 2).

TABLE 1

Irgacure 184 (both at 320-390 nm)

| | | Film nD | | ΔnD | |
|---|---|---|---|---|---|
| Base nD | Gel nD | 15 min/side | 30 min/side | 15 min/side | 30 min/side |
| 1.5525 | 1.5745 | 1.5791 | 1.5855 | 0.0046 | 0.0110 |

TABLE 2

Irgacure 651 (both at 15 min/side)

| | | Film nD | | ΔnD | |
|---|---|---|---|---|---|
| Base nD | Gel nD | 320-390 nm | 400-500 nm | 320-390 nm | 400-500 nm |
| 1.5525 | 1.5751 | 1.5862 | 1.5838 | 0.0111 | 0.0087 |

E. Pull Test (Adhesion): Two optical lenses were made that had a base and cap made form 1.6 index material sandwiched with about a 0.5mm LF. One LF was made with irgacure 184 photoinitiator and the other with Irgacure 651. A pull test was conducted to see if the dye had an adverse effect on adhesion between the LF and the base and cap (Table 3). Lenses were flooded under standard conditions to fully cure the LF.

TABLE 3

Pull Test Results

| | Lens 1 | Lens 1 |
|---|---|---|
| Irgacure 184 | 1200 psi at Cap | 1070 psi at Cap |
| Irgacure 651 | 1000 psi at JB Weld | 960 psi at Goo |

F. Stability: The stability of the dye during lens manufacturing was evaluated by preparing a solution of Solvent Blue 35 in LF Part I at a concentration of 0.00187% (sufficient to give 0.0010% in mixed LF). The solution of dye in LF Part I was thermally aged at 75° C. for simulated 1, 2, 3, 6, and 12 months. This would determine what shelf-life, if any, was appropriated for ZLF III Part I containing dye.

TABLE 4

Shelf Life in Part I with Solvent Blue 35

| | | Chromaticity Coordinates | | |
|---|---|---|---|---|
| Months | nD | x | y | z |
| 0 | 1.5825 | 0.308 | 0.328 | 0.364 |
| 1 | 1.5847 | 0.308 | 0.328 | 0.364 |
| 2 | 1.5849 | 0.306 | 0.327 | 0.367 |
| 3 | 1.5850 | 0.307 | 0.327 | 0.366 |
| 6 | 1.5851 | 0.308 | 0.328 | 0.365 |
| 12 | 1.5851 | 0.306 | 0.329 | 0.365 |

The refractive index changed slightly during the first simulated month, then remained fairly steady. A comparable study on an untinted lot of LF shows constant refractive index through three months. This should be taken into account when formulating the LF and making optical lenses.

TABLE 5

Shelf Life in Part I

| | | Chromaticity Coordinates | | |
|---|---|---|---|---|
| Months | nD | x | y | z |
| 0 | 1.5843 | 0.314 | 0.329 | 0.357 |
| 1 | 1.5842 | 0.313 | 0.332 | 0.354 |
| 2 | 1.5840 | 0.313 | 0.333 | 0.354 |
| 3 | 1.5840 | 0.313 | 0.331 | 0.356 |

Chromaticity coordinates in ZLF III Part I with and without Solvent Blue 35 hold steady, showing that the color is not shifting. No color change is discernable by a visual inspection.

G. Yellow Color Comparison: To allay concerns that the 0.0010 wt % may leave the lenses slightly yellow, slides and lenses of LF made with 0.0015 wt % and 0.0020 wt % Solvent Blue 35 were prepared. Eight lenses were measured for Yellowness Index at the unfolded stage (LF not fully cured). Four of the lenses were flooded to fully cure the LF. Two of the lenses were flooded conventionally on the hotboxes. The other two lenses were flooded on the MISTRAL for 37 minutes. YI readings were taken on the flooded lenses after flooding and then again after the application of a hard coat and anti-reflective coat. See Tables 6 and 7 for results.

TABLE 6

Yellowness Index on Higher Concentrations of Solvent Blue 35

| Tray | Status | Dye Conc. | YI |
|---|---|---|---|
| 11133L | Unflooded | 0.0015% | 5.079 |
| 11133R | Unflooded | 0.0015% | 5.209 |
| 10236L | Unflooded | 0.0015% | 6.177 |
| 10236R | Unflooded | 0.0015% | 5.941 |
| 12048L | Unflooded | 0.0020% | 5.208 |
| 12048R | Unflooded | 0.0020% | 4.988 |
| 10164L | Unflooded | 0.0020% | 5.136 |
| 10164R | Unflooded | 0.0020% | 4.839 |
| 10236L | Flooded on Hotbox | 0.0015% | 7.799 |
| 10236R | Flooded on MISTRAL | 0.0015% | 7.505 |
| 12048L | Flooded on Hotbox | 0.0020% | 7.464 |
| 12048R | Flooded on MISTRAL | 0.0020% | 6.780 |
| 10236L | Flooded on Hotbox and Coated | 0.0015% | 7.553 |
| 10236R | Flooded on MISTRAL and Coated | 0.0015% | 7.419 |
| 12048L | Flooded on Hotbox and Coated | 0.0020% | 7.312 |
| 12048R | Flooded on MISTRAL and Coated | 0.0020% | 7.200 |

TABLE 7

Yellowness Index Deltas in Higher Concentrations of Solvent Blue 35

| | 0.0015% | | 0.0020% | |
|---|---|---|---|---|
| YI | Hotbox | Mistral 37 minutes | Hotbox | Mistral 37 minutes |
| Initial | 6.177 | 5.941 | 5.208 | 4.988 |
| Final | 7.799 | 7.505 | 7.464 | 6.780 |
| Delta | 1.622 | 1.564 | 2.256 | 1.792 |

These were judged too blue for a regular optical lens. A second set of slides made with 0.0012% Solvent Blue 35 (Table 8) was judged acceptable for a regular optical lens.

TABLE 8

Composition of 0.0012% Part I

| gm Epo 2 | gm Ene 1 | gm Solvent Blue 35 | % Dye in Part I | % Dye in ZLF III | Gel nD | Film nD | ΔnD |
|---|---|---|---|---|---|---|---|
| 26.66 | 13.06 | 0.00089 | 0.00224% | 0.00120% | 1.5772 | 1.5869 | 0.0097 |

The final determination was made between 0.0010% and 0.0012% Solvent Blue 35 in the LF. These lenses were flooded on the MISTRAL. Yellowness Index after flooding was slightly better than that of conventional lenses (Table 9).

TABLE 9

Yellowness Index of Flooded Blue Lenses

| | YI |
|---|---|
| 0.0010% | 10.5 |
| 0.0010% | 10.3 |
| 0.0010% | 10.3 |
| 0.0010% | 10.7 |

TABLE 9-continued

Yellowness Index of Flooded Blue Lenses

| | YI |
|---|---|
| 0.0012% | 9.5 |
| 0.0012% | 9.5 |
| 0.0012% | 9.6 |
| 0.0012% | 9.3 |

Applying hard coat and AR to the lenses did not appreciably affect the Yellowness Index (Table 10). Note that the lenses are not necessarily listed in the same order in both tables.

TABLE 10

Yellowness Index of Coated Blue Lenses

| | YI |
|---|---|
| 0.0010% | 10.7 |
| 0.0010% | 10.3 |
| 0.0010% | 10.3 |
| 0.0010% | 9.8 |
| 0.0012% | 9.5 |
| 0.0012% | 9.3 |
| 0.0012% | 9.6 |
| 0.0012% | 9.9 |

Figure 1A:
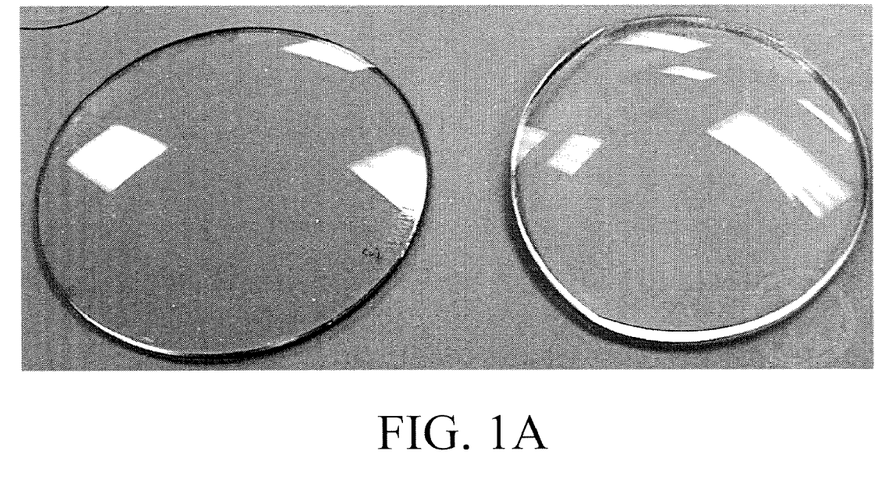
FIG. 1A shows a comparison of Light Blue Lens (left) with Untinted Lens.
Figure 1B:
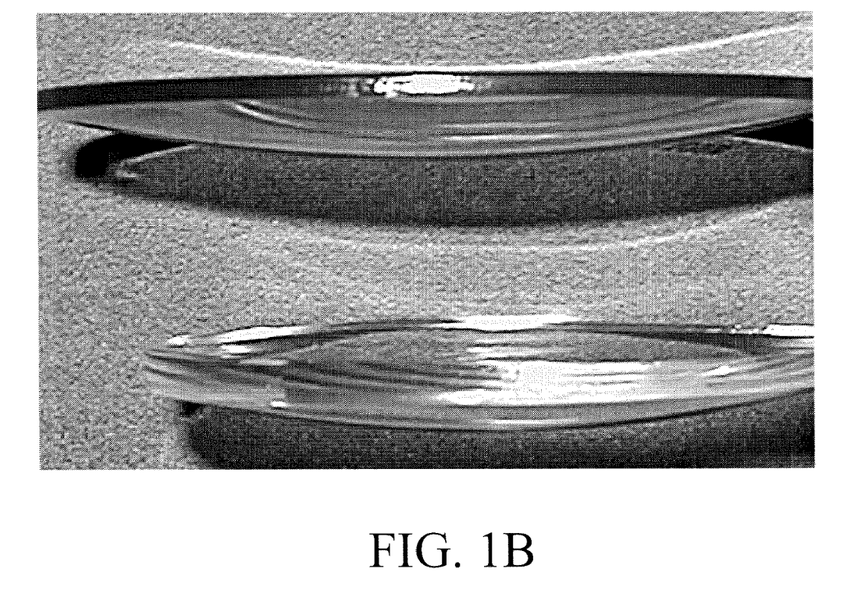
FIG. 1B shows a comparison of Light Blue Lens (top) with Untinted Lens.

Based on visual inspection of the lenses, it was determined that 0.0012% Solvent Blue 35 in LF was the preferred concentration. When compared with a standard lens made with untinted LF the difference in color is noticeable (FIGS. 1A and 1B).

H. Thermal Aging: Thermal aging studies at 75° C. were conducted on the finished optical lenses made with LF at both concentrations (0.0010 wt % and 0.0012 wt %). Results show that the color is stable (see Table 18).

TABLE 18

Thermal Aging of Finished Lenses

| Dye Conc. | Time | x | y | z |
|---|---|---|---|---|
| 0.0010% | 0 months | 0.316 | 0.333 | 0.351 |
| 0.0010% | 1 months | 0.315 | 0.333 | 0.352 |
| 0.0010% | 2 months | 0.315 | 0.332 | 0.352 |
| 0.0010% | 3 months | 0.315 | 0.332 | 0.353 |
| 0.0010% | 6 months | 0.315 | 0.332 | 0.352 |
| 0.0010% | 12 months | 0.315 | 0.332 | 0.353 |
| 0.0010% | 18 months | 0.315 | 0.332 | 0.353 |
| 0.0010% | 24 months | 0.315 | 0.332 | 0.353 |
| 0.0012% | 0 months | 0.314 | 0.331 | 0.354 |
| 0.0012% | 1 months | 0.314 | 0.331 | 0.354 |
| 0.0012% | 2 months | 0.314 | 0.331 | 0.354 |

TABLE 18-continued

Thermal Aging of Finished Lenses

| Dye Conc. | Time | x | y | z |
|---|---|---|---|---|
| 0.0012% | 3 months | 0.314 | 0.331 | 0.355 |
| 0.0012% | 6 months | 0.314 | 0.332 | 0.354 |
| 0.0012% | 12 months | 0.314 | 0.332 | 0.355 |
| 0.0012% | 18 months | 0.314 | 0.331 | 0.355 |
| 0.0012% | 24 months | 0.313 | 0.332 | 0.355 |

I. Outdoor/UV Aging: Finished optical lenses made with LF at both concentrations (0.0010 wt % and 0.0012 wt %) were also sent out for UV exposure to simulate outside wear. One lens from each concentration was exposed for 5 days and two lenses for each concentration were exposed for 10 days. These exposures correlate roughly with 1 and 2 years simulated outdoor exposure. Results are summarized in Table 19 and Table 20.

TABLE 19

UV Aging of Finished Lenses

| Dye Conc. | Time | x | y | z |
|---|---|---|---|---|
| 0.0010% | 0 Days | 0.316 | 0.333 | 0.351 |
| 0.0010% | 5 Days | 0.317 | 0.333 | 0.350 |
| 0.0010% | 10 Days | 0.318 | 0.336 | 0.345 |
| 0.0010% | 10 Days | 0.318 | 0.336 | 0.347 |
| 0.0012% | 0 Days | 0.314 | 0.331 | 0.354 |
| 0.0012% | 5 Days | 0.317 | 0.333 | 0.350 |
| 0.0012% | 10 Days | 0.318 | 0.336 | 0.345 |
| 0.0012% | 10 Days | 0.317 | 0.334 | 0.349 |

TABLE 20

UV Aging of Finished Lenses

| Dye Conc. | Time | Yellowness Index |
|---|---|---|
| 0.0010% | 0 Days | 10.3 |
| 0.0010% | 5 Days | 11.2 |
| 0.0010% | 10 Days | 13.0 |
| 0.0010% | 10 Days | 12.5 |
| 0.0012% | 0 Days | 9.6 |
| 0.0012% | 5 Days | 11.2 |
| 0.0012% | 10 Days | 13.0 |
| 0.0012% | 10 Days | 11.7 |

J. Thermal Stability of Dye in LF Part II: The dye can also be added to Part II of the LF (See Example 1) instead of in Part I. Aging studies were conducted with the 0.0012% Solvent Blue 35 in LF Part II at 75° C. Results are shown in Table 21.

TABLE 21

Aging studies in Part II

| Months | x | y | z |
|---|---|---|---|
| 0 | 0.297 | 0.321 | 0.381 |
| 1 | 0.302 | 0.324 | 0.374 |
| 2 | 0.300 | 0.324 | 0.376 |
| 3 | 0.301 | 0.326 | 0.374 |
| 6 | 0.303 | 0.326 | 0.370 |
| 12 | 0.305 | 0.327 | 0.368 |
| 24 | 0.304 | 0.326 | 0.370 |

EXAMPLE 14

Sunglasses

A. Gray Tinted Lenses: Solvent Black 7 and Solvent Blue 35 were used to make gray sunglasses lenses. A lens formulation (LF) described in Example 2 was made and Solvent Black 7 and Solvent Blue 35 were dissolved in Part II (prior to mixing with Part I) in amounts to make the final concentration of the dyes in the LF 0.09 wt % for Solvent Black 7 and 0.009 wt % for Solvent Blue 35. Simulated aging studies of Part II containing the dyes was conducted at 75° C. (Table 22).

TABLE 22

| Months | x | y | z |
|---|---|---|---|
| 0 | 0.205 | 0.193 | 0.602 |
| 1 | 0.211 | 0.210 | 0.579 |
| 2 | 0.200 | 0.201 | 0.599 |
| 3 | 0.197 | 0.207 | 0.595 |
| 6 | 0.290 | 0.364 | 0.346 |
| 12 | 0.297 | 0.383 | 0.320 |

Simulated aging studies were also conducted in gels made by mixing Part I and Part II (partially cured with heat) and films (fully cured by UV light). See results in Tables 23 and 24.

TABLE 23

Aging of Gray Gels at 75° C.

| Months | nD | x | y | z |
|---|---|---|---|---|
| 0 | 1.5720 | 0.303 | 0.348 | 0.349 |
| 1 | 1.5730 | 0.296 | 0.345 | 0.359 |
| 2 | 1.5750 | 0.296 | 0.348 | 0.356 |
| 3 | 1.5760 | 0.288 | 0.338 | 0.374 |
| 6 | 1.5770 | 0.276 | 0.333 | 0.391 |
| 12 | 1.5740 | 0.270 | 0.327 | 0.402 |
| 24 | 1.5785 | 0.260 | 0.318 | 0.422 |

TABLE 24

Aging of Gray Films at 75° C.

| Months | nD | x | y | z |
|---|---|---|---|---|
| 0 | 1.5820 | 0.287 | 0.303 | 0.410 |
| 1 | 1.5815 | 0.298 | 0.335 | 0.367 |
| 2 | 1.5830 | 0.299 | 0.339 | 0.362 |
| 3 | 1.5835 | 0.296 | 0.335 | 0.369 |
| 6 | 1.5840 | 0.290 | 0.334 | 0.376 |
| 12 | 1.5790 | 0.286 | 0.333 | 0.381 |
| 24 | 1.5790 | 0.287 | 0.337 | 0.376 |

B. Gray Tinted lenses #2: Another lens formulation kit and lens formulation (LF) were made that were identical to the kit and LF described in Examples 1 and 2 with the exception that Iracure 651 initiator was used instead of Irgacure 184. New aging studies with the Part II component having the same concentrations of Solvent Black 7 and Solvent Blue 35 description in Example 14A were performed (Table 25).

TABLE 25

| | x | y | z |
|---|---|---|---|
| 0 Months | 0.174 | 0.140 | 0.686 |
| 1 Month | 0.173 | 0.141 | 0.687 |

TABLE 25-continued

|  | x | y | z |
|---|---|---|---|
| 2 Months | 0.170 | 0.169 | 0.661 |
| 3 Months | 0.211 | 0.258 | 0.530 |
| 6 Months | 0.205 | 0.194 | 0.601 |

For production purposes Gray Part II should be discarded after 1 month based on the results listed in Table 253. In color intensity tests (data not shown) it was determined that the thickness of the LF in the sunglass lens should be as uniform as possible to avoid color variations in the lens. Preferably, the thickness of the lens should be controlled to ±0.5 mm and preferably ±2 mm. The tinted LF did not have an adverse effect on the adhesion of the LF to the lenses. The tinted lenses were also tested to be stable for up to 2 years in accelerated stability tests,

EXAMPLE 15

Green Tinted Sunglass Lenses

The procedures in Example 14 were carried out to make green tinted sunglass lenses. A dye combination of 0.05 wt % Solvent Black 7, 0.02 wt % Solvent Green 2 and 0.009 wt % Solvent Brown 1 (based on the weight of the LF) was used to tint the LF. In this Example 15 the brown and green dyes were dissolved in Part I of the LF and black dye was dissolved in Part II of the LF. The mixed LF had a stability of one month and did not adversely effect curing and adhesion. The color in the lens was also stable.

EXAMPLE 16

Brown Tinted Sunglass Lenses

The procedures in Example 14 were carried out to make brown tinted sunglass lenses. A dye combination of 0.04 wt % Solvent Green 2 and 0.14 wt % Solvent Brown 1 (based on the weight of the LF) was used to tint the LF. Irgacure 651 (0.3%) was used as the photoinitiator and the cure conditions employed to cure the LF were 45 J/cm$^2$ at 85° C. The mixed LF had a stability of one month and did not adversely effect curing and adhesion. The color in the lens was also stable.

We claim:

1. A method of tinting a wavefront aberrator that contains a sandwich configuration of two transparent plates having a cured polymer sandwiched in between said plates, said method comprising adding an effective amount of a dye to said curable polymer prior to said polymer being cured whereby the said wavefront aberrator is a sunglass lens.

2. The method of claim 1, wherein the dye is a a permanent dye.

3. The method of claim 2, wherein the cured polymer is a layer having a thickness of less than about 1 mm.

4. A method of making a sunglass wavefront aberrator which comprises: a. providing two transparent plates; b. depositing a layer of curable material between the two transparent plates wherein said curable material contains one or more monomers and an effective amount of a dye; and c. curing the curable material to form the sunglass wavefront aberrator.

5. The method of claim 4, wherein the transparent plates are ophthalmic lenses.

6. The method of claim 5, wherein the ophthalmic lenses comprise a base and a cap.

7. The method of claim 4, wherein the curing step produces a polymer layer having a variable index of refraction.

8. The method of claim 4, wherein the curing step produces a polymer layer having a constant index of refraction.

9. The method of claim 4, wherein the dye is a a permanent dye.

10. The method of claim 9, wherein the at least one permanent dye provides gray, brown, or green colors in the layer.

11. The method of claim 6, wherein the cured polymer is a layer between said base and cap and said layer is less than about 0.5 mm thick.

12. In a method of making a wavefront aberrator by forming a layer of curable material between two transparent plates and curing said curable material, the improvement which comprises: adding an effective amount of a dye to said curable material prior to curing, wherein the wavefront aberrator comprises a sunglass wavefront aberrator when exposed to UV-light or sunlight.

13. The method of claim 12, wherein the dye is photochromic dye.

14. The method of claim 13, wherein the photochromic dye provides gray, brown, green, blue, yellow, orange, red, violet, or a combination of these colors in the layer.

* * * * *